Jan. 22, 1963 SAKAE FUJIMOTO 3,074,724

APPARATUS FOR POSITIONING RECORDING AND RECORDED SHEETS ON A MAGNETIC RECORDER AND REPRODUCER

Filed Sept. 14, 1960

United States Patent Office 3,074,724
Patented Jan. 22, 1963

3,074,724

APPARATUS FOR POSITIONING RECORDING AND RECORDED SHEETS ON A MAGNETIC RECORDER AND REPRODUCER

Sakae Fujimoto, Chofu, Japan, assignor to Riken Kogaku Kogyo Kabushiki Kaisha, Tokyo, Japan, a corporation of Japan, and Nihon Denki Bunka Kogyo Kabushiki Kaisha, Tokyo, Japan, a corporation of Japan Filed Sept. 14, 1960, Ser. No. 55,874
Claims priority, application Japan Sept. 15, 1959
1 Claim. (Cl. 274—4)

This invention relates to a device for positioning a sheet material to be recorded or a recorded sheet material in a magnetic recording and reproducing machine of spiral track type.

Various attempts have been previously made to position a sheet material to be recorded or a recorded sheet material in a magnetic recording and reproducing machine. For example, short pins for positioning such sheet material have been planted on a top plate of a machine casing. This has a fear of causing a position of a rotatory disk relative to the positioning pins to be incorrect when a base plate carrying the rotatary disk is incorrectly disposed within the machine casing. A position, for example, the starting position of a transducer mounted on the rotatary disk relative to the positioning pins is the case. Therefore, if a sheet material magnetically recorded by one of magnetic recording and reproducing machines including the positioning pins such as above described will be used with another of such machines for reproducing the recorded information, a transducer in the latter machine will not accurately follow a spiral magnetized track on the sheet material, resulting in low output and inarticulateness of reproduced information.

An object of the invention, accordingly is to provide an improved device for positioning accurately and easily a sheet material to be recorded or a recorded sheet material in a magnetic recording and reproducing machine of spiral track type.

Figure 1:
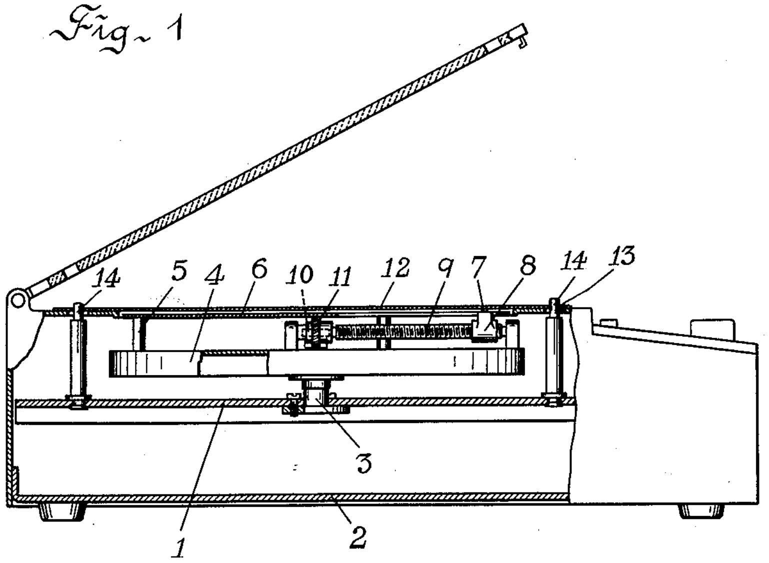
Figure 2:
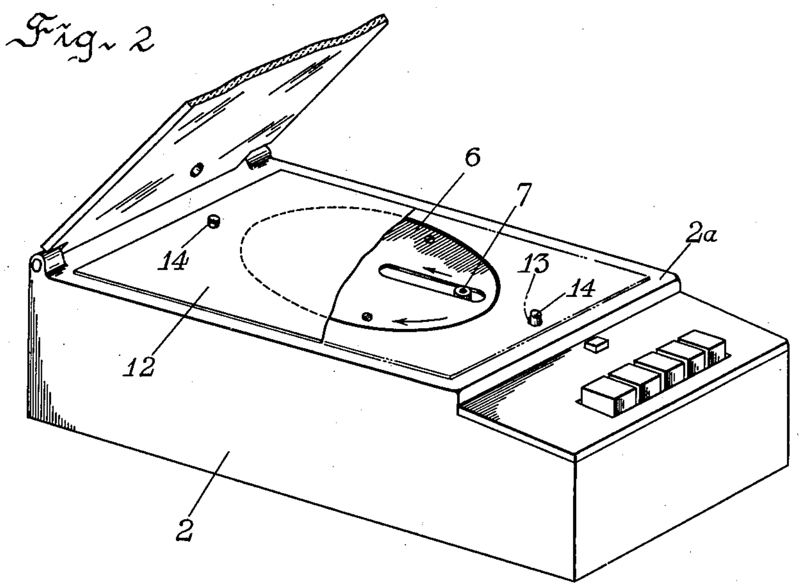

The invention will now be described in conjunction with the accompanying drawings in which FIG. 1 shows a longitudinal sectional view of a magnetic recording and reproducing machine of spiral track type embodying the invention; and FIG. 2 shows an external view, in perspective, of the machine illustrated in FIG. 1.

The magnetic recording and reproducing machine of spiral track type illustrated in the drawings comprises a casing 2, within which a base plate 1 as shown in FIG. 1 is disposed in parallel relationship with a top plate 2*a* thereof. A vertical shaft 3 extending upwardly from the base plate 1 rotatably carries a rotatory disk 4 with a pendent periphery, above which a circular plate 6 is rigidly secured to the disk by means of several supporting bars 5 secured to the disk. The circular plate 6 is rotatably fitted into a circular opening formed on the top plate 2*a*. The base plate 1 includes secured thereto a reversible motor (not shown) operative to drive through a belt and a pulley a transmission friction wheel (not shown) provided on the upper face of the base plate. The transmission friction wheel as operated is made in contact with the rotatory disk 4 on its pendent periphery and can rotate the lower disk 4 and the upper circular plate 6 as one unit in either of the forward and reverse directions.

A feed screw 9 is horizontally carried by the rotatary disk 4 above the same and includes a support member 8 for supporting a transducer 7 and engaging the same. The screw 9 also includes a helical gear 10 rigidly secured thereto which, in turn meshes with a central helical gear 11 rigidly secured to the vertical shaft 3. The rotation of the gear 10 effects the rotation of the feed screw 9 to thereby move the transducer 7 along the screw.

As shown in FIG. 2, the transducer 7 is disposed within a radial slot formed on the circular plate 6 and is, under a low pressure, made in contact with a lower face of a sheet material 12 as disposed on the top plate 2*a* of the casing 2. The sheet material may be either a recorded sheet or a sheet to be recorded as the case may be.

In operation, the motor is energized to rotate the circular plate 6 in the direction of the arrow shown in FIG. 2 and simultaneously to move the transducer 7 inwardly, resulting in spiral movement of the transducer 7 relative to the sheet material 12.

According to the invention, instead of the top plate, the base plate 1 is provided with a number of positioning rods 14 extending upwardly and including its free end portion projecting beyond the top plate 2*a* of the casing 2. The sheet material 12 is provided with small apertures equal in number to the positioning rods and corresponding in position to the same when the sheet material is disposed in position on the top plate 2*a*.

When the sheet material 12 is disposed on the top plate 2*a* of the casing 2 with the positioning rods 14 fitted into the corresponding apertures on the sheet material respectively, the same is always maintained in its correct position relative to the rotatory disk. Accordingly, a sheet material carrying a spiral track magnetically recorded by one of machines comprising the positioning rods as above described can be used with another of such machines with the reproducing transducer accurately following the spiral, recorded track resulting in reproduction of articulate sound information with a high efficiency.

What I claim is:

In a magnetic recording and reproducing machine of spiral track type, a device for positioning recording and recorded sheets therein, comprising a rotatory disk supported for rotation on a base plate, a transducer mounted on said rotatory disk for radial movement with respect thereto, a top plate mounted above said rotatory disk and approximately parallel thereto, said top plate having a center opening adapted to the extension therebeyond of said transducer, and defining a plurality of holes between said top plate's outer limits and center opening, a plurality of positioning rods mounted on and extending upwardly from said base plate, and said positioning rods having their free end portions projecting through said top plate holes and beyond said top plate, recording and recorded sheets defining apertures adapted to fit over the free end portions of said positioning rods when said sheets are successively placed on said top plate, whereby said sheets are always identically positioned relative to the respective base plates and associated supported rotatory disks and transducers of any similar recording and reproducing machines.

References Cited in the file of this patent

UNITED STATES PATENTS

| | | |
|---|---|---|
| 2,092,668 | Goldsmith | Sept. 7, 1937 |
| 2,926,018 | Hoshino | Feb. 23, 1960 |
| 2,962,559 | Hoshino | Nov. 29, 1960 |
| 2,986,609 | Hoshino | May 30, 1961 |